(12) United States Patent
Grant et al.

(10) Patent No.: US 8,542,105 B2
(45) Date of Patent: Sep. 24, 2013

(54) HANDHELD COMPUTER INTERFACE WITH HAPTIC FEEDBACK

(75) Inventors: Danny A. Grant, Laval (CA); Erin Ramsay, Montreal (CA); David M. Birnbaum, Oakland, CA (US); Hendrik Bartel, San Francisco, CA (US); Juan Manuel Cruz-Hernandez, Montreal (CA); Robert W. Heubel, San Leandro, CA (US)

(73) Assignee: Immersion Corporation, San Jose, CA (US)

( * ) Notice: Subject to any disclaimer, the term of this patent is extended or adjusted under 35 U.S.C. 154(b) by 778 days.

(21) Appl. No.: 12/624,577

(22) Filed: Nov. 24, 2009

(65) Prior Publication Data
US 2011/0121953 A1    May 26, 2011

(51) Int. Cl.
| | |
|---|---|
| H04B 3/36 | (2006.01) |
| G08B 6/00 | (2006.01) |
| A63F 9/24 | (2006.01) |
| A63F 7/20 | (2006.01) |
| G01D 13/22 | (2006.01) |
| G09G 5/00 | (2006.01) |
| G06F 3/033 | (2013.01) |
| G06F 3/01 | (2006.01) |

(52) U.S. Cl.
USPC ........... 340/407.1; 340/407.2; 463/2; 463/37; 463/38; 273/317.1; 116/205; 345/156; 345/184; 715/701; 715/702

(58) Field of Classification Search
USPC ........... 340/407.1, 407.2; 345/156, 173–179; 715/700–702
See application file for complete search history.

(56) References Cited

U.S. PATENT DOCUMENTS

| 3,623,046 A | 11/1971 | Scourtes |
| 3,832,895 A | 9/1974 | Strandh |
| 3,875,488 A | 4/1975 | Crocker et al. |

(Continued)

FOREIGN PATENT DOCUMENTS

| DE | 19613025 A1 | 3/1996 |
| EP | 0265011 | 10/1987 |

(Continued)

OTHER PUBLICATIONS

Adachi, Yoshitaka et al., "Sensory Evaluation of Virtual Haptic Push-Buttons," Technical Research Center, 1994, 7 pages.

(Continued)

*Primary Examiner* — Daniel Wu
*Assistant Examiner* — Muhammad Adnan
(74) *Attorney, Agent, or Firm* — Medler Ferro PLLC

(57) ABSTRACT

Various systems, devices, and methods are provided for generating an impact and/or surface haptic effect for a handheld computer interface such as a video game controller. For example, the handheld computer interface may include a handle coupled to an impact actuator. The impact actuator includes a movable mass and an end stop. The impact actuator may receive a haptic effect signal and in response cause the mass to contact the end stop to generate a haptic effect. A smart material that outputs a surface haptic effect may be coupled to a surface of the handle such that the surface haptic effect is output substantially from the smart material rather than the handle. The handle may be coupled to an end piece having a shape that simulates an object such as a tennis racket, golf club, or other object.

13 Claims, 8 Drawing Sheets

(56) References Cited

U.S. PATENT DOCUMENTS

| | | | |
|---|---|---|---|
| 3,911,416 | A | 10/1975 | Feder |
| 4,237,439 | A | 12/1980 | Nemoto |
| 4,262,240 | A | 4/1981 | Arai |
| 4,262,549 | A | 4/1981 | Schwellenbach |
| 4,382,217 | A | 5/1983 | Horner et al. |
| 4,422,060 | A | 12/1983 | Matsumoto et al. |
| 4,689,449 | A | 8/1987 | Rosen |
| 4,731,603 | A | 3/1988 | McRae et al. |
| 4,758,692 | A | 7/1988 | Roeser et al. |
| 4,782,327 | A | 11/1988 | Kley et al. |
| 4,787,051 | A | 11/1988 | Olson |
| 4,794,384 | A | 12/1988 | Jackson |
| 4,795,296 | A | 1/1989 | Jau |
| 4,803,413 | A | 2/1989 | Kendig et al. |
| 4,825,157 | A | 4/1989 | Mikan |
| 4,839,838 | A | 6/1989 | LaBiche et al. |
| 4,861,269 | A | 8/1989 | Meenen, Jr. |
| 4,868,549 | A | 9/1989 | Affinito et al. |
| 4,891,764 | A | 1/1990 | McIntosh |
| 4,897,582 | A | 1/1990 | Otten et al. |
| 4,906,843 | A | 3/1990 | Jones et al. |
| 4,933,584 | A | 6/1990 | Harms et al. |
| 4,935,728 | A | 6/1990 | Kley |
| 4,961,138 | A | 10/1990 | Gorniak |
| 5,022,384 | A | 6/1991 | Freels et al. |
| 5,095,303 | A | 3/1992 | Clark et al. |
| 5,107,080 | A | 4/1992 | Rosen |
| 5,107,262 | A | 4/1992 | Cadoz et al. |
| 5,128,671 | A | 7/1992 | Thomas, Jr. |
| 5,138,154 | A | 8/1992 | Hotelling |
| 5,146,566 | A | 9/1992 | Hollis, Jr. et al. |
| 5,175,459 | A | 12/1992 | Danial et al. |
| 5,184,310 | A | 2/1993 | Takenouchi |
| 5,193,963 | A | 3/1993 | McAffee et al. |
| 5,194,786 | A | 3/1993 | Smith et al. |
| 5,223,776 | A | 6/1993 | Radke et al. |
| 5,228,356 | A | 7/1993 | Chuang |
| 5,235,868 | A | 8/1993 | Culver |
| 5,245,245 | A | 9/1993 | Goldenberg |
| 5,264,768 | A | 11/1993 | Gregory et al. |
| 5,271,290 | A | 12/1993 | Fischer |
| 5,283,970 | A | 2/1994 | Aigner |
| 5,296,871 | A | 3/1994 | Paley |
| 5,313,230 | A | 5/1994 | Venolia et al. |
| 5,321,762 | A | 6/1994 | Stuart |
| 5,327,790 | A | 7/1994 | Levin et al. |
| 5,334,893 | A | 8/1994 | Oudet et al. |
| 5,374,942 | A | 12/1994 | Gilligan et al. |
| 5,396,266 | A | 3/1995 | Brimhall |
| 5,398,044 | A | 3/1995 | Hill |
| 5,399,091 | A | 3/1995 | Mitsumoto |
| 5,434,549 | A | 7/1995 | Hirabayashi et al. |
| 5,436,640 | A | 7/1995 | Reeves |
| 5,440,183 | A | 8/1995 | Denne |
| 5,456,341 | A | 10/1995 | Garnjost et al. |
| 5,457,479 | A | 10/1995 | Cheng |
| 5,473,235 | A | 12/1995 | Lance et al. |
| 5,473,344 | A | 12/1995 | Bacon et al. |
| 5,477,237 | A | 12/1995 | Parks |
| 5,489,812 | A | 2/1996 | Furuhata et al. |
| 5,491,477 | A | 2/1996 | Clark et al. |
| 5,492,312 | A | 2/1996 | Carlson |
| 5,506,605 | A | 4/1996 | Paley |
| 5,530,455 | A | 6/1996 | Gillick et al. |
| 5,542,672 | A | 8/1996 | Meredith |
| 5,543,821 | A | 8/1996 | Marchis et al. |
| 5,554,900 | A | 9/1996 | Pop, Sr. |
| 5,571,997 | A | 11/1996 | Gray et al. |
| 5,576,704 | A | 11/1996 | Baker et al. |
| 5,589,828 | A | 12/1996 | Armstrong |
| 5,589,854 | A | 12/1996 | Tsai |
| 5,591,082 | A | 1/1997 | Jensen et al. |
| 5,625,576 | A | 4/1997 | Massie et al. |
| 5,643,087 | A | 7/1997 | Marcus et al. |
| 5,649,020 | A | 7/1997 | McClurg et al. |
| 5,650,704 | A | 7/1997 | Pratt et al. |
| 5,652,603 | A | 7/1997 | Abrams |
| 5,656,901 | A | 8/1997 | Kurita |
| 5,661,446 | A | 8/1997 | Anderson et al. |
| 5,666,138 | A | 9/1997 | Culver |
| 5,666,473 | A | 9/1997 | Wallace |
| 5,668,423 | A | 9/1997 | You et al. |
| 5,687,080 | A | 11/1997 | Hoyt et al. |
| 5,689,285 | A | 11/1997 | Asher |
| 5,691,747 | A | 11/1997 | Amano |
| 5,694,153 | A | 12/1997 | Aoyagi et al. |
| 5,696,537 | A | 12/1997 | Solhjell |
| 5,712,725 | A | 1/1998 | Faltermeier et al. |
| 5,714,978 | A | 2/1998 | Yamanaka et al. |
| 5,724,068 | A | 3/1998 | Sanchez et al. |
| 5,724,106 | A | 3/1998 | Autry et al. |
| 5,734,236 | A | 3/1998 | Motegi |
| 5,736,978 | A | 4/1998 | Hasser et al. |
| 5,739,811 | A | 4/1998 | Rosenberg et al. |
| 5,745,057 | A | 4/1998 | Sasaki et al. |
| 5,749,533 | A | 5/1998 | Daniels |
| 5,749,577 | A | 5/1998 | Couch et al. |
| 5,754,023 | A | 5/1998 | Roston et al. |
| 5,760,764 | A | 6/1998 | Martinelli |
| 5,771,037 | A | 6/1998 | Jackson |
| 5,781,172 | A | 7/1998 | Engel et al. |
| 5,784,052 | A | 7/1998 | Keyson |
| 5,790,108 | A | 8/1998 | Salcudean et al. |
| 5,793,598 | A | 8/1998 | Watanabe et al. |
| 5,805,140 | A | 9/1998 | Rosenberg et al. |
| 5,808,381 | A | 9/1998 | Aoyama et al. |
| 5,808,568 | A | 9/1998 | Wu |
| 5,808,603 | A | 9/1998 | Chen |
| 5,816,105 | A | 10/1998 | Adelstein |
| 5,821,921 | A | 10/1998 | Osborn et al. |
| 5,823,876 | A | 10/1998 | Unbehand |
| 5,828,363 | A | 10/1998 | Yaniger et al. |
| 5,831,596 | A | 11/1998 | Marshall et al. |
| 5,831,597 | A | 11/1998 | West et al. |
| 5,835,693 | A | 11/1998 | Lynch et al. |
| 5,841,428 | A | 11/1998 | Jaeger et al. |
| 5,861,699 | A | 1/1999 | Kopac |
| 5,868,573 | A | 2/1999 | Kerby et al. |
| 5,889,506 | A | 3/1999 | Lopresti et al. |
| 5,894,263 | A | 4/1999 | Shimakawa et al. |
| 5,896,076 | A | 4/1999 | van Namen |
| 5,897,437 | A * | 4/1999 | Nishiumi et al. ............... 463/47 |
| 5,912,661 | A | 6/1999 | Siddiqui |
| 5,914,705 | A | 6/1999 | Johnson et al. |
| 5,945,772 | A | 8/1999 | Macnak et al. |
| 5,956,016 | A | 9/1999 | Kuenzner et al. |
| 5,984,785 | A | 11/1999 | Takeda et al. |
| 5,990,869 | A | 11/1999 | Kubica et al. |
| 6,002,184 | A * | 12/1999 | Delson et al. ................... 310/14 |
| 6,004,134 | A | 12/1999 | Marcus et al. |
| 6,005,551 | A | 12/1999 | Osborne et al. |
| 6,044,646 | A | 4/2000 | Silverbrook |
| 6,050,718 | A | 4/2000 | Schena et al. |
| 6,057,753 | A | 5/2000 | Myers |
| 6,057,828 | A | 5/2000 | Rosenberg et al. |
| 6,067,871 | A | 5/2000 | Markyvech et al. |
| 6,071,194 | A | 6/2000 | Sanderson et al. |
| 6,078,126 | A | 6/2000 | Rollins et al. |
| 6,097,964 | A | 8/2000 | Nuovo et al. |
| 6,100,874 | A | 8/2000 | Schena et al. |
| 6,102,803 | A | 8/2000 | Takeda et al. |
| 6,104,382 | A | 8/2000 | Martin et al. |
| 6,161,126 | A | 12/2000 | Wies et al. |
| 6,162,123 | A | 12/2000 | Woolston |
| 6,171,191 | B1 | 1/2001 | Ogata et al. |
| 6,218,966 | B1 | 4/2001 | Goodwin et al. |
| 6,225,976 | B1 | 5/2001 | Yates et al. |
| 6,239,784 | B1 | 5/2001 | Holmes |
| 6,246,391 | B1 | 6/2001 | Ong |
| 6,268,671 | B1 | 7/2001 | Furuki |
| 6,271,834 | B1 | 8/2001 | May et al. |
| RE37,374 | E * | 9/2001 | Roston et al. ................. 318/561 |
| 6,307,465 | B1 | 10/2001 | Kayama et al. |
| 6,310,604 | B1 | 10/2001 | Furusho et al. |

| | | | |
|---|---|---|---|
| 6,317,032 B1 | 11/2001 | Oishi | |
| 6,323,841 B1 | 11/2001 | Lai | |
| 6,339,419 B1 | 1/2002 | Jolly et al. | |
| 6,373,465 B2 | 4/2002 | Jolly et al. | |
| 6,394,239 B1 | 5/2002 | Carlson | |
| 6,404,107 B1 | 6/2002 | Lazarus et al. | |
| 6,420,806 B2 | 7/2002 | Wittig | |
| 6,422,941 B1 | 7/2002 | Thorner et al. | |
| 6,437,770 B1 | 8/2002 | Venema et al. | |
| 6,452,586 B1 | 9/2002 | Holmdahl et al. | |
| 6,456,024 B1 | 9/2002 | Schmider et al. | |
| 6,468,158 B1 | 10/2002 | Ootori et al. | |
| 6,480,185 B1 | 11/2002 | Kiljander et al. | |
| 6,485,113 B2 | 11/2002 | Riley et al. | |
| 6,487,421 B2 | 11/2002 | Hess et al. | |
| 6,501,203 B2 | 12/2002 | Tryggvason | |
| 6,535,806 B2 | 3/2003 | Millsap et al. | |
| 6,587,091 B2 | 7/2003 | Serpa | |
| 6,618,037 B2 | 9/2003 | Sakamaki et al. | |
| 6,639,581 B1 | 10/2003 | Moore et al. | |
| 6,646,632 B2 | 11/2003 | Loughnane et al. | |
| 6,654,003 B2 | 11/2003 | Boldy | |
| 6,664,664 B2 | 12/2003 | Botos et al. | |
| 6,686,901 B2 | 2/2004 | Rosenberg | |
| 6,693,626 B1 | 2/2004 | Rosenberg | |
| 6,707,443 B2 | 3/2004 | Bruneau et al. | |
| 6,717,573 B1 | 4/2004 | Shahoian et al. | |
| 6,809,727 B2 | 10/2004 | Piot et al. | |
| 6,854,573 B2 | 2/2005 | Jolly et al. | |
| 6,904,823 B2 | 6/2005 | Levin et al. | |
| 6,906,700 B1 | 6/2005 | Armstrong | |
| 6,924,787 B2 | 8/2005 | Kramer et al. | |
| 7,024,625 B2 | 4/2006 | Shalit | |
| 7,161,580 B2 * | 1/2007 | Bailey et al. | 345/156 |
| 7,175,642 B2 | 2/2007 | Briggs et al. | |
| 7,176,892 B2 | 2/2007 | Kobayashi | |
| 2002/0030663 A1 | 3/2002 | Tierling et al. | |
| 2002/0185919 A1 | 12/2002 | Botos et al. | |
| 2004/0056840 A1 * | 3/2004 | Goldenberg et al. | 345/156 |
| 2004/0100440 A1 * | 5/2004 | Levin et al. | 345/156 |
| 2005/0007342 A1 | 1/2005 | Cruz-Hernandez et al. | |
| 2005/0017454 A1 * | 1/2005 | Endo et al. | 273/317.1 |
| 2005/0275967 A1 * | 12/2005 | Olien et al. | 360/119 |
| 2007/0060391 A1 * | 3/2007 | Ikeda et al. | 463/46 |
| 2007/0298877 A1 * | 12/2007 | Rosenberg | 463/30 |
| 2008/0001484 A1 * | 1/2008 | Fuller et al. | 310/15 |

FOREIGN PATENT DOCUMENTS

| | | |
|---|---|---|
| EP | 0326439 A2 | 2/1989 |
| EP | 0607580 | 7/1994 |
| EP | 0680132 A1 | 11/1995 |
| EP | 0834338 A2 | 4/1998 |
| EP | 0835802 A1 | 4/1998 |
| EP | 0872809 A1 | 10/1998 |
| EP | 0970714 A2 | 1/2000 |
| EP | 1182851 | 2/2002 |
| JP | 4-034610 | 2/1992 |
| JP | 4131924 | 5/1992 |
| JP | 7-013693 | 1/1995 |
| JP | 7-182104 | 7/1995 |
| JP | 09-026850 | 1/1997 |
| JP | 09-282094 | 10/1997 |
| JP | 2001-242974 | 2/2000 |
| WO | WO 98/04968 | 2/1998 |
| WO | WO 00/03319 A1 | 1/2000 |
| WO | WO 00/39783 | 7/2000 |
| WO | WO 02/078810 A1 | 10/2002 |
| WO | WO 2007143140 A2 * | 12/2007 |

OTHER PUBLICATIONS

Akamatsu, M., et al., "Multi-Modal Mouse: A Mouse type device with tactile and force display," Presence, vol. 3 No. 1, 1994, pp. 73-80.

Berkelman, P., "Interacting with Virtual Environments using a Magnetic Levitation Haptic Interface," International Conference on Intelligent Robots and Systems, IROS '95, Pittsburgh, pp. 117-122, Aug. 1995, reprint.

Buttolo, P., "Hard Disk Actuators for Mini Teleoperation," Telemanipulator and Telepresence Technologies Symposium, 1994, pp. 55-61.

Carreras, R. "Introducing a Revolutionary Moving Magnet Linear Motor," www.enduratec.com, 2003, 5 pages.

"Useful Technology for Your Idea File", Design News, Mar. 7, 1994, pp. 63.

Ellis, R. E., et al., "Design and Evaluation of a High-Performance Prototype Planar Haptic Interface", DSC—vol. 49, Advances in Robotics, Mechatronics and Haptic Interfaces, ASME 1993, pp. 55-64.

ESA (European Space Agency), "Automation and Robotics", Sep. 15, 2000, pp. 21-23.

Gobel, M., et al., "Tactile Feedback Applied to Computer Mice," International Journal of Human-Computer Interaction, vol. 7, No. 1, 1995, pp. 1-24.

IBM Corporation, "Foot-Operated Mouse," vol. 28, IBM Technical Disclosure Bulletin No. 11, Apr. 1986, p. 4763.

IBM Corporation, "Mouse Ball-actuating Device with Force and Tactile Feedback," vol. 32 IBM Technical Disclosure Bulletin No. 9B, Feb. 1990, pp. 230-235.

"3D Human Interface Tool," Immersion Corporation, 1994, 2 pages.

Iwata, H., "Pen-based Haptic Virtual Environment," in IEEE Annual Virtual Reality International Symposium, IEEE Service Center, (Seattle, WA, USA), 0-7803-1363-1/93 IEEE, 1993, pp. 287-292.

Jackson, K. M., "Linearity of Radio-Frequency Transducers," Medical and Biological Engineering and Computer, Jul. 1977, pp. 446-449.

Kashani, R., "Tuned Mass Dampers and Vibration Absorbers," www.deicon.com, Apr. 2004, pp. 1-5.

Logitech Developer Support, "Logitech Cyberman Swift Supplement, Revision: 1.0," Logitech Inc., Fremont, CA, 1994, pp. iii-29.

Millman, Paul A., et al., "Design of a Four Degree-of-Freedom Force-Reflecting Manipulandum with a Specified Force/Torque Workspace," Dept. of Mechanical Engineering, 1991, pp. 1488-1493.

Ouhyoung, Ming et al., "A Low-Cost Force Feedback Joystick and Its Use in PC Video Games," IEEE Transactions on Consumer Electronics, vol. 41, No. 3, Aug. 1995, pp. 787-794.

Pocock, Bruce, "Mini Mouse Uses Resistance Bridging," Useful Technology for Your Idea File, 2004, www.designnews.com, pp. 1-4.

Ramstein, Christophe et al., "The Pantograph: A Large Workspace Haptic Device for a Multimodal Human-Computer Interaction", Computer-Human Interaction, CHI 1994, 3 pages.

Anonymous, "Joystick with Tactile Feedback," Research Disclosure, Nov. 1987, 1 page.

Russo, M., et al., "Controlling Dissipative Magnetic Particle Brakes in Force Reflective Devices," DSC—vol. 42, Advances in Robotics, ASME 1992, pp. 63-70.

Saito, K. et al., "A Microprocessor-Controlled Speed Regulator with Instantaneous Speed Estimation for Motor Drives," Proceedings of the IEEE Transactions on Industrial Electronics, vol. 35, No. 1, Feb. 1988, pp. 95-99.

Schmult, Brian et al., "Application Areas for a Force-Feedback Joystick", DSC—vol. 49, Advances in Robotisc, Mechatronics, and Haptic Interfaces, ASME 1993, pp. 47-54.

Shahinpoor, M., "A New Effect in Ionic Polymeric Gels: The Ionic Flexogelectric Effect," in: Proc. SPIE 1995 North American Conference on Smart Structures and Materials, Feb. 28-Mar. 2, 1995, San Diego, CA, vol. 2441, No. 05, 1995, pp. 42-53.

* cited by examiner

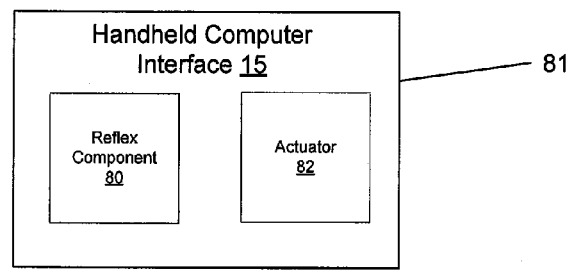
Fig. 8
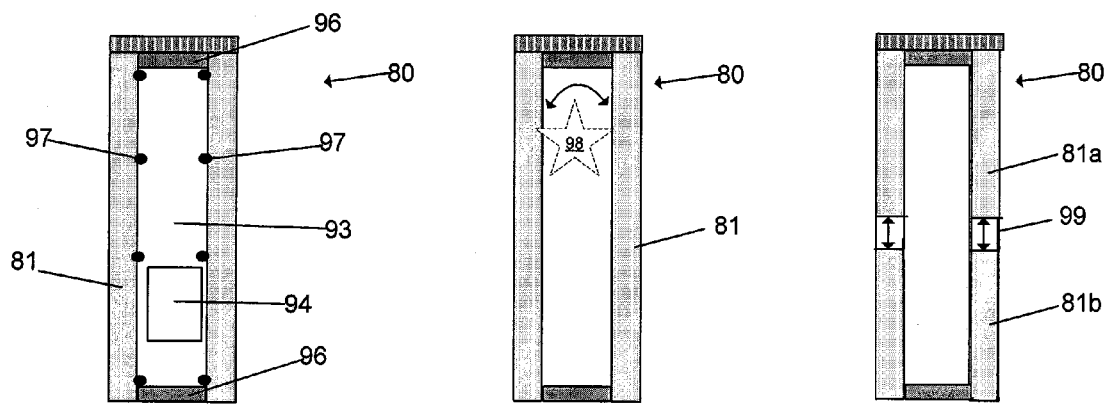
Fig. 9 a   Fig. 9 b   Fig. 9c
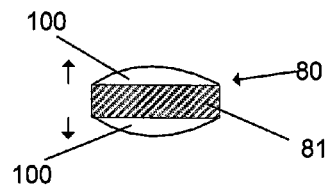
Fig. 9d

HANDHELD COMPUTER INTERFACE WITH HAPTIC FEEDBACK

FIELD OF THE INVENTION

One embodiment is directed generally to a computer interface, and in particular to a handheld computer interface that includes haptic feedback.

BACKGROUND INFORMATION

Haptic feedback can be generated by a device and sensed by kinesthetic receptors to allow a user of the device to perceive forces such as inertia and acceleration. Typically, this kind of haptic feedback is created by applying a force to the body through a physical interface which is grounded to a wall or desk. Also known as "tethered" interfaces, such devices are limited in their range, mobility, and ultimately usability because of their reliance on being coupled to an external structure.

SUMMARY OF THE INVENTION

Various systems, devices, and methods are provided for generating an impact and/or surface haptic effect for a handheld computer interface such as a video game controller. The computer interface can be used with, for example, computer games and device simulators to create a high intensity, high frequency, short duration haptic effect used to simulate collisions with external objects such as baseballs or swords, or recoil from shooting projectiles.

According to various embodiments of the invention, the handheld computer interface may include a handle coupled to an impact actuator. The impact actuator may include a movable mass and an end stop. The impact actuator may receive a haptic effect signal and in response cause the mass to contact the end stop to generate a haptic effect.

According to various embodiments of the invention, a smart material that outputs a surface haptic effect may be coupled to a surface of the handle such that the surface haptic effect is output substantially from the smart material rather than the handle or otherwise housing of the handheld computer interface.

According to various embodiments of the invention, the handle may be coupled to an end piece having a shape that simulates an object such as a tennis racket, golf club, or other object. In some embodiments, the end piece may be removably coupled to the handle. In this manner, the handheld computer interface may be used to simulate various real-world objects.

BRIEF DESCRIPTION OF THE DRAWINGS

FIG. 8 is a block diagram of an example handheld computer interface, according to an embodiment.

FIGS. 9a, 9b, 9c, and 9d are examples of a reflex component, according to various embodiments

DETAILED DESCRIPTION

One embodiment is a handheld computer interface that generates a haptic feedback effect with an impact actuator that impacts a portion of a handle of the interface. The computer interface can be used with, for example, computer games and device simulators to create a high intensity, high frequency, short duration haptic effect used to simulate collisions with external objects such as baseballs or swords, or recoil from shooting projectiles.

Figure 1:
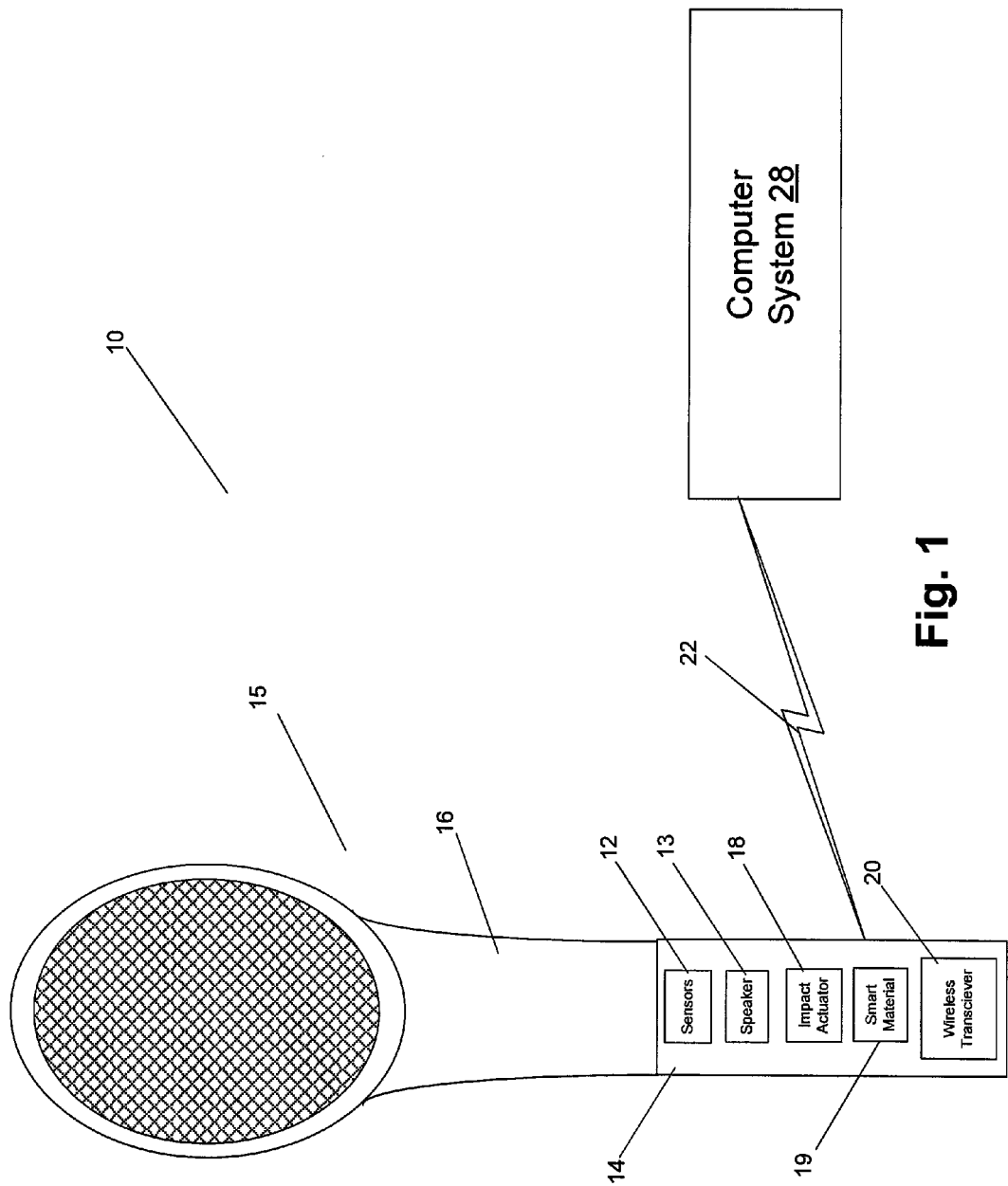
FIG. 1 is a perspective view of a computer interface system in accordance with one embodiment.

FIG. 1 is a block diagram of a computer interface system 10 in accordance with one embodiment. Computer interface system 10 includes a handheld computer interface 15 that includes a handle 14 coupled to an end piece 16. Handle 14, described in more detail below, includes an impact actuator 18 to create haptic feedback. Handle 14 can also include other types of actuators to create additional haptic feedback. End piece 16 in one embodiment is removably attached to handle 14 so that it can be changed depending on the device that interface 15 is intended to simulate. For example, in FIG. 1 end piece 16 allows interface 15 to simulate and represent a tennis racquet. Other shaped end pieces can be used to simulate a ping pong paddle, pool cue, baseball bat, golf club, gun, sword, etc. According to various embodiments of the invention, end piece 16 may also include additional haptic actuators (not otherwise illustrated in FIG. 1). In some embodiments, the additional haptic actuators may be general-purpose such that they may be used for various haptic effects. In some embodiments, the additional haptic actuators may pertain specifically to the device that interface 15 is intended to simulate via a particular type of end piece 16. In these embodiments, an end piece 16 simulating a golf club, for example, may include additional haptic actuators that are used to generate haptic effects related to a golf swing. Interface 15 may house a speaker 13 that outputs audio. Interface 15 further houses a wireless transceiver 20 and one or more sensors 12. Wireless transceiver 20 wirelessly couples interface 15 to a computer system 28 via wireless link 22. In other embodiments, interface 15 can be coupled to computer system 28 via any other known methods, including wired methods.

Sensors 12 may include one or more of the following types of sensors:

- An accelerometer for sensing acceleration and estimating orientation against gravity;
- A gyroscope for sensing swings and rotary velocity to improve gestural capture;
- Electric field sensors on the body of interface 15, for multi-touch and/or proximity sensing;
- A strain gauge and/or piezo for sensing bend, twist, and/or physical impact;
- An infrared reflection sensor for proximity sensing;
- A camera for pickup of onscreen cues and/or other visual recognition tasks;
- A microphone for ambient sound, voice input, vibration, and/or breath pressure sensing; and Buttons/joysticks/X-pads/triggers for standard gaming operations.

In other embodiments, handheld interface 15 includes other actuators in addition to impact actuator 18. These additional actuators can be used to create other haptic feedback in addition to the haptic feedback that is generated by impact actuator 18. The additional actuators may include:

An center of mass ("COM") actuator that varies a position of a mass to create inertial effects to change the perceived "weight" of interface 15;

A vibrotactile/vibration actuator, capable of generating a wide variety of vibrotactile effects such as confirmation, envelopes, kinetic-like physics simulations, etc. In one embodiment, a piezoelectric-based actuator wrapped around handle 14 generates the vibrotactile effects, an example of which is described below with respect to smart material 19;

A "flying mass actuator" that is similar to the COM actuator but that is capable of responding to user input by changing its position in real-time and at high speed, an example of which is described with respect to FIG. 6 below.

According to various embodiments of the invention, handle 14 may include or otherwise be coupled with a smart material 19, which may include a piezo, shape-memory alloy, or other smart material. Smart material 19 may be coupled to a surface of handle 14, thereby directly imparting a surface haptic effect to the user substantially from smart material 19 rather than from handle 14. In some embodiments, the surface haptic effect may supplement (i.e., be in addition to) vibrotactile haptic feedback described above. Smart material 19 may be in a shape of a strip coupled to the surface of handle 14, may encompass (fully or partially wrap) handle 14, and/or other configuration coupled to the surface of handle 14.

In some embodiments, a cover portion (not otherwise illustrated in FIG. 1) may be coupled to smart material 19. For example, smart material 19 may be protected from contact by the user and/or environment with the cover portion. The cover portion may be made of any material such as rubber, plastic, or other material that protects smart material 19 from contact by the user and/or environment. In these embodiments, the surface haptic effect may be imparted substantially from smart material 19 and at least in part through the cover portion rather than the surface of handle 14.

Figure 2:
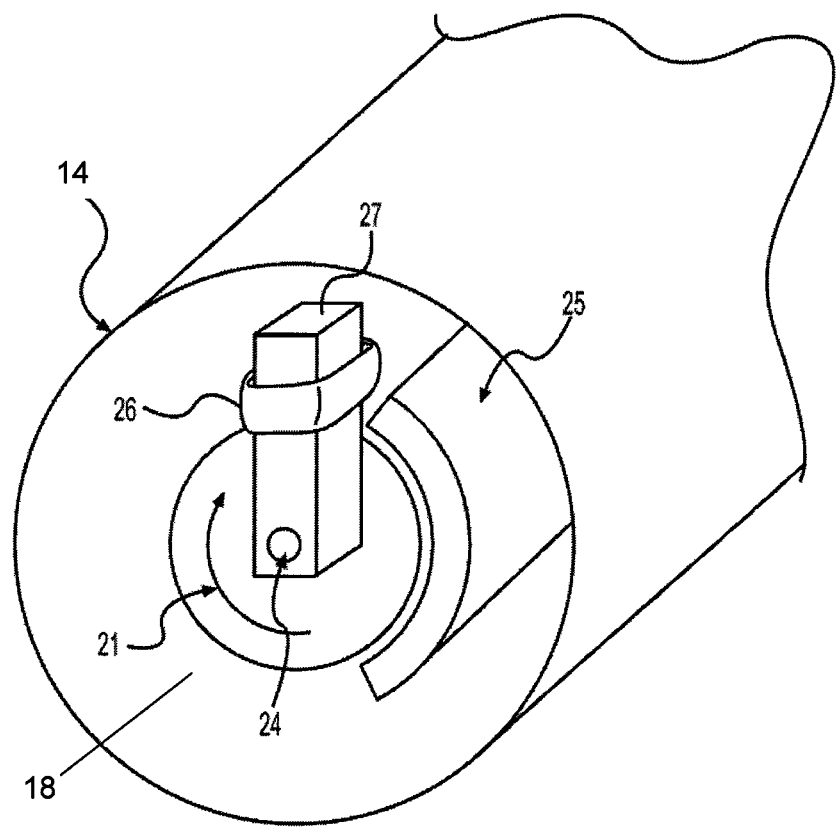
FIG. 2 is a cross-sectional perspective view of a handle and impact actuator in accordance with one embodiment.

FIG. 2 is a cross-sectional perspective view of handle 14 and impact actuator 18 in accordance with one embodiment. Impact actuator 18 includes a motor 21 and an end stop 25. End stop 25 in one embodiment is a cut-away portion of a plastic tube that is coupled to handle 14. In one embodiment, motor 21 is a high performance linear or rotary motor that is capable of generating relatively high torque. Motor 21 includes a shaft 24 that rotates in a circular motion. A weight 27 is coupled to shaft 24. A rubber bumper or band 26 is coupled to weight 27.

In operation, computer system 28 of FIG. 1 generates a signal to create an impact haptic effect. The signal is applied to motor 21, which causes shaft 24 and weight 27 to rotate with a relatively high torque. Shaft 24 rotates in either direction to the point where bumper 26 contacts end stop 25. This contact creates the impact haptic effect. As shown, shaft 24 rotates approximately 180° and less than 360° before contacting end stop 25. The rotation and contact of bumper can be repeated to create a series of impact haptic effects.

Figure 3:
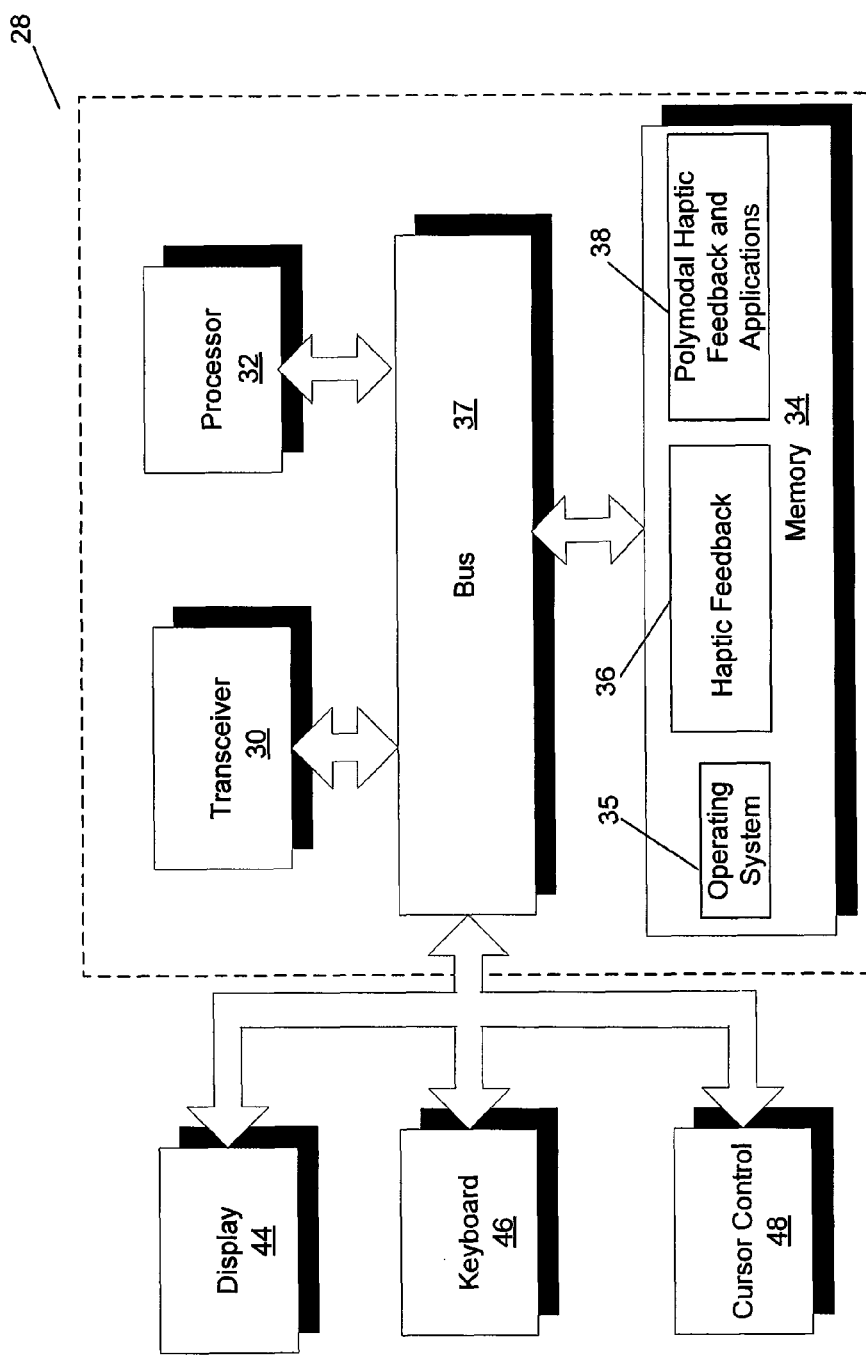
FIG. 3 is a block diagram of a computer system that is wirelessly coupled to a handheld interface in accordance with one embodiment.

FIG. 3 is a block diagram of computer system 28 that is wirelessly coupled to handheld interface 15 in one embodiment. System 28 includes a bus 37 or other communication mechanism for communicating information, and a processor 32 coupled to bus 37 for processing information. Processor 32 may be any type of general or specific purpose processor. System 28 further includes a memory 34 for storing information and instructions to be executed by processor 32. Memory 34 can be comprised of any combination of random access memory ("RAM"), read only memory ("ROM"), static storage such as a magnetic or optical disk, or any other type of computer readable media. System 28 further includes a transceiver 30 that provides communication with transceiver 20 of handheld interface 15. Computer system 28 may be a general purpose computer, or it may be a specialty computer system such as a video game console.

Computer readable media may be any available media that can be accessed by processor 32 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 32 is further coupled via bus 37 to a display 44, such as a Liquid Crystal Display ("LCD"), for displaying information to a user. A keyboard 46 and a cursor control device 48, such as a computer mouse, is further coupled to bus 37 to enable a user to interface with system 28 as an alternative or in addition to using handheld interface 15.

In one embodiment, memory 34 stores software modules that provide functionality when executed by processor 32. The modules include an operating system 35 that provides operating system functionality for system 28. The modules further include a haptic feedback module 36 that generates haptic feedback on handheld interface 15 through impact actuator 18. System 28 further includes a polymodal haptic feedback and applications module 38 that generates additional haptic feedback on handheld interface 15, and includes an application such as a video game that requires haptic feedback to be generated on handheld interface 15 in conjunction with the application. In another embodiment, the functionality of modules 36 and 38 is subsumed in a single haptic feedback management module that is responsible for synthesizing and displaying polymodal haptic effects, including mass bias (kinesthesia), mass motion (kinesthesia), vibration (vibrotaction), impact (vibrotaction), etc. The haptic feedback management module takes a generalized, physics-based feedback profile (e.g., size of interface, position of interface, position of ball impact, and other contextual factors within the virtual environment) and dispatches haptic feedback signals to individual actuators as appropriate (e.g., vibration, impact, COM, etc.).

Figure 4:
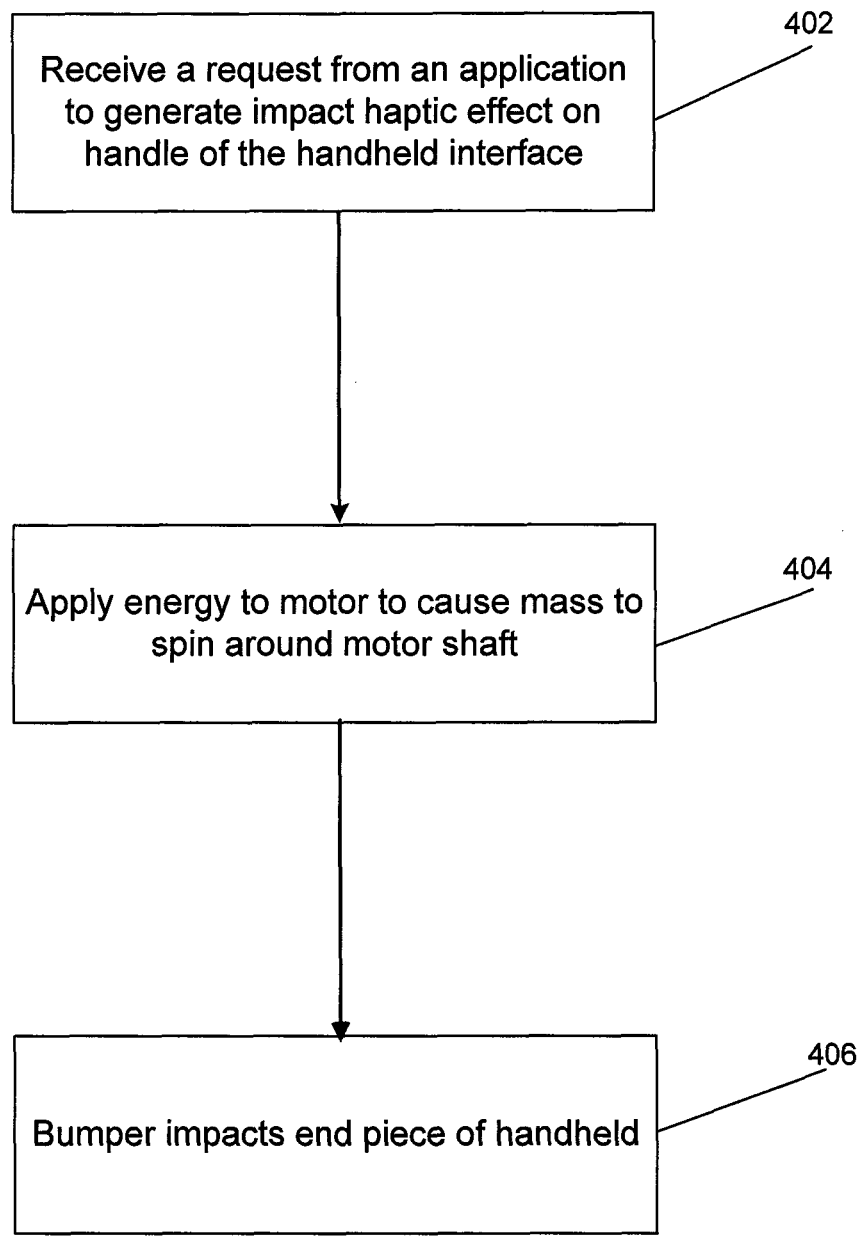
FIG. 4 is a flow diagram of the functionality of a haptic feedback module when initiating impact haptic effects on the handheld interface in accordance with one embodiment.

In one embodiment, haptic feedback module 36 initiates impact haptic effects on handheld interface 15. FIG. 4 is a flow diagram of the functionality of haptic feedback module 36 when initiating impact haptic effects on handheld interface 15 in accordance with one embodiment. In one embodiment, portions of the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, haptic feedback module 36 receives a request from application 38 to generate an impact haptic effect on handle 14 of handheld interface 15. Application 38 may be an interactive video game such as a golf or baseball game, or any type of application that may be enhanced or requires an impact haptic effect.

At 404, haptic feedback module 36 initiates the application of energy to motor 21 to cause mass 27 to spin around motor shaft 24.

At 406, bumper 28 impacts end stop 25, thus causing an impact haptic effect. The functionality of 402, 404 and 406 can be repeatedly applied to generate multiple impact haptic effects. Further, bumper 28 can repeatedly contact end stop 25 at high frequency and a small travel path to generate a vibration haptic effect.

Concurrently with the haptic feedback requests at 402, polymodal haptic feedback and application module 38 may also generate other haptic feedback requests that are sent to other actuators of handheld interface 15 to generate other types of haptic feedback such as vibrations, COM variations, etc.

Figure 5B:
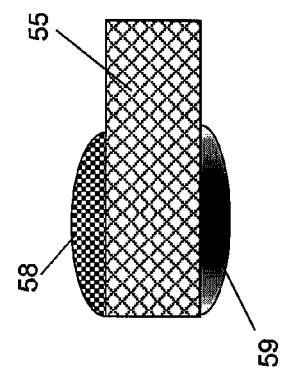
FIG. 5b is a plan view of an end stop or blocker in accordance with another embodiment.
Figure 5A:
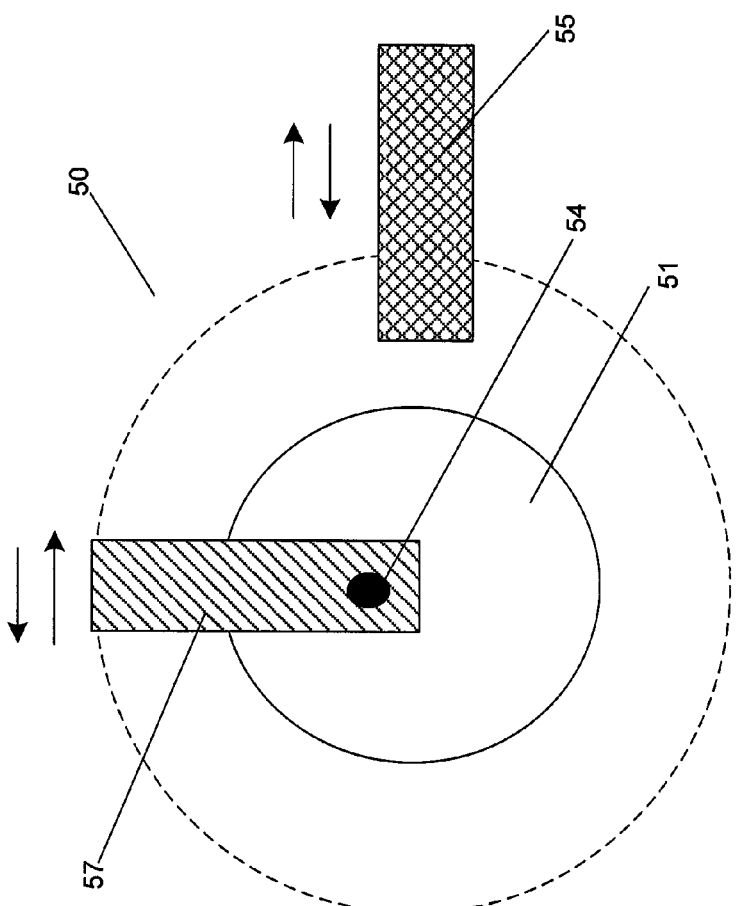
FIG. 5a is a plan view of an impact actuator in accordance with another embodiment.

FIG. 5a is a plan view of an impact actuator 50 in accordance with another embodiment. Similar to impact actuator 18 of FIG. 2, impact actuator 50 includes a motor 51 with a shaft 54, and a rotating mass 57. In operation, mass 57 can rotate unobstructed through one or more revolutions in order to build up the necessary speed. At that point, an end stop or blocker 55 is mechanically moved into the path of mass 57, which creates an impact. Therefore, motor 51 does not require a high level of torque in comparison with motor 21 of actuator 18, and can be a relatively low cost rotary motor. However, in one embodiment, haptic feedback module 36 when using actuator 50 to generate an impact haptic effect anticipates farther in advance when an impact haptic effect should be generated because actuator 50 takes longer than actuator 18 to generate the effect.

FIG. 5b is a plan view of end stop or blocker 55 in accordance with another embodiment. Blocker 55 includes bumpers 58 and 59 on opposite sides made from different impact materials to create different impact sensations depending on the rotation direction of mass 57. For example, bumper 58 can be made from soft rubber and bumper 59 can be made from hard plastic.

Figure 6:
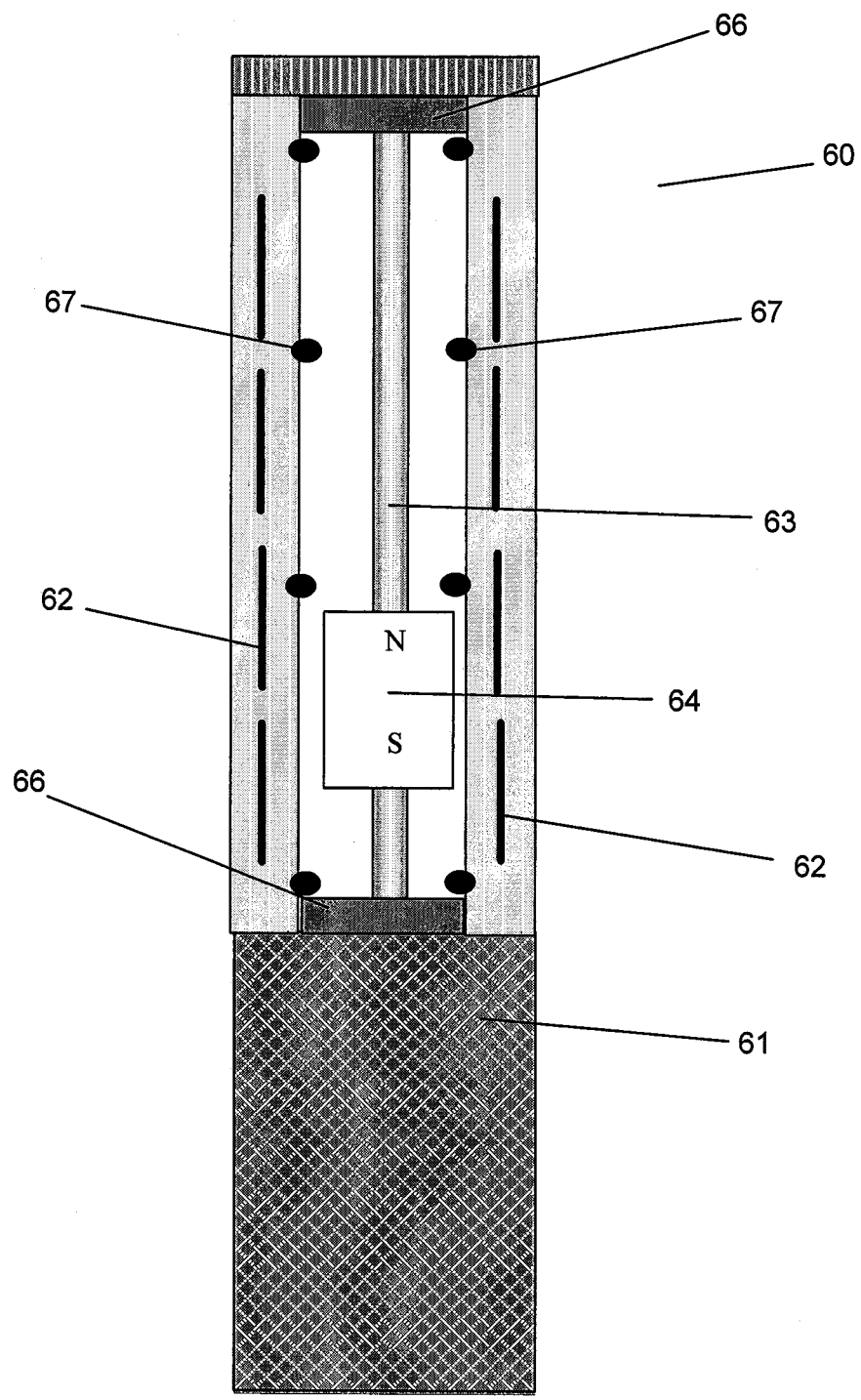
FIG. 6 is a partial cut-away view of a linear impact actuator in accordance with another embodiment.

FIG. 6 is a partial cut-away view of a linear impact actuator 60 in accordance with another embodiment. Impact actuator 60 includes a handle section 61, coils 62, and a magnetic mass 64 that travels along guide shaft 63. Guide shaft 63 includes a position sensor for detecting the position of mass 64. Actuator 60 further includes end stops or bumpers 66 that are made of the same material (e.g., soft rubber) as one another or different materials (e.g., soft rubber, hard rubber) from one another. Finally, actuator 60 includes retractable brakes 67. Each brake 67 may be made of the same material (e.g., soft rubber) as one another or different materials (e.g., soft rubber, hard rubber) from one another.

In operation, a signal is generated by haptic feedback module 36 which energizes coils 62, which causes mass 64 to travel along shaft 63. To create the impact haptic effect, mass 64 can be allowed to impact one of bumpers 63, or can be stopped by one of brakes 67 for a shorter travel length. The variations in travel length causes different impact haptic effects. For example, to emulate the impact from a relatively long golf swing, mass 64 can travel the full length of shaft 63. To emulate the impact from a relatively short ping pong swing, brakes 67 can shorten the length of travel of mass 64. Further, the material properties of brakes 67 and bumpers 63 can be used to modulate the properties of an impact haptic effect. For example, to emulate the impact for a baseball bat, a foul tip can use soft rubber materials while a hard solid baseball hit can use hard rubber materials.

In some embodiments, linear impact actuator 60 may be configured such that a user-generated motion at least partially causes mass 64 to travel along shaft 63, thereby supplementing the travel of mass 64 along shaft 63 caused by energizing coils 62. For example, a golf swing motion may cause mass 64 to travel along shaft 63, supplementing the travel of mass 64 caused by energizing coils 62. In this manner, energizing coils 62 and the motion of linear impact actuator 60 may cause mass 64 to travel along shaft 63. In some embodiments, linear impact actuator 60 may include sensors (not otherwise illustrated in FIG. 6) configured to measure movement of mass 64 and/or linear impact actuator 60. Motion information from the sensors may be used to tailor one or more signals to linear impact actuator 60 to cause a haptic effect, thereby supplementing, arresting, and/or otherwise modulating the haptic effect imparted by mass 64.

Figure 7:
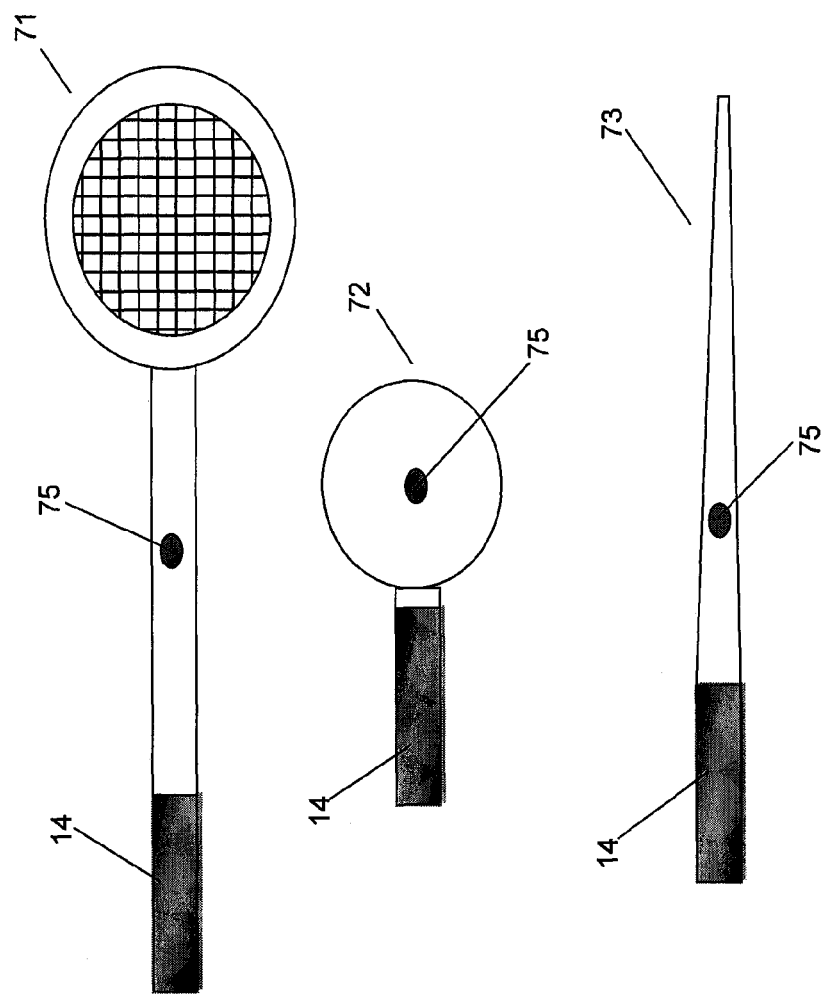
FIG. 7 is a plan view of embodiments of a handle coupled to various end pieces to emulate different sport related interfaces.

FIG. 7 is a plan view of embodiments of handle 14 coupled to various end pieces to emulate different sport related interfaces. As shown, the interfaces include a badminton racquet 71, a ping pong paddle 72, and a pool cue 73. A speaker 75 is included in each of the embodiments. In one embodiment, the interface, including the handle and end piece, has a weight of less than 1000 grams, a handle diameter less than 45 mm, a handle length less than 200 mm, and an end piece length of 100 mm-500 mm, depending on the type of sport that the interface is emulating.

In addition to the impact actuator, one embodiment includes eccentric rotating mass ("ERM") actuators and linear resonant actuators ("LRAs"), possibly at each end of the interface, in order to create complimentary haptic effects. In one embodiment, the audio speaker generates less than 30 decibels and is located on the various end pieces to create realistic impact sounds at the virtual impact location. In one embodiment, the interface includes a sensor for sensing six degree of freedom of the interface's position, and a sensor for sensing the position of the shaft of the rotary actuator or the position of the mass of the linear actuator.

As an example of scenarios that can effectively utilize the interface in accordance with embodiments, consider a user facing a large screen capable of displaying three-dimensional images. The user is holding a computer interface in accordance with one embodiment that has an end piece with the appearance of a badminton racquet. On the screen an opponent is getting ready to serve. After the serve the bird appears to come out of the screen towards the user who swings and hits the bird back toward the screen. The sensation of impact is faithfully conveyed to the user via the impact haptic actuator in the handle and the "swish" of contact is heard from the speaker that is located on the end piece. The opponent successfully returns the bird and this time the user misses and receives no haptic feedback and a low audible whoosh of the racquet from the speaker as it passes through thin air.

In another scenario, a large flat screen may be placed on a table, displaying a pool table in three-dimensions. The balls are capable of interacting in a familiar and natural manner. The user is holding a computer interface in accordance with one embodiment that has an end piece with the appearance of a pool cue. As the user lines up for a shot, vibrotactile haptic feedback is generated to guide the user to the right position. The vibrotactile haptic feedback is a changing haptic pattern that is conveyed to allow the user to recognize when the cue is properly aligned for a tricky combination shot. The user initiates the shot and feels the impact of the cue hitting the white ball through the impact actuator. The user then feels a vibrotactile haptic pattern that provides feedback on the quality of the stroke, as the balls move naturally on the table.

In another scenario, the user is holding a computer interface in accordance with one embodiment that is used to control a virtual sword and has an end piece with the appearance of a sword. As the user causes the virtual sword to move using the computer interface, vibrotactile haptic feedback may be provided. In some embodiments, when the user causes the virtual sword to impact another virtual object (such as, for instance, another virtual sword, a virtual shield, a virtual character), vibrotactile haptic feedback may be provided. The vibrotactile haptic feedback may differ based on a type of virtual object impacted by the virtual sword, thereby providing different vibrotactile haptic feedback for different types and/or materials of virtual objects that are impacted.

FIG. 8 is a block diagram of an example handheld computer interface 15, according to an embodiment. According to the embodiment illustrated in FIG. 8, handheld computer interface 15 includes a reflex component 80, a housing (or body) 81, and an actuator 82. Reflex component 80 may respond to a user-generated force exerted on handheld computer interface 15 by outputting a reflex haptic effect via handheld computer interface 15. The user-generated force may include, for example, a swinging motion of handheld computer interface 15, a squeezing force (such as a pressure exerted by the user against housing 81), or other force exerted on handheld computer interface 15. Actuator 82 may include, for example, a rotary actuator, a piezo-electric actuator, a solenoid, or other haptic actuator configured to generate haptic feedback.

In some embodiments, the reflex haptic effect may supplement (i.e., be in addition to) or be resistive to the haptic effect caused by actuator 82 and vice versa. In other embodiments, actuator 82 causes substantially all of the haptic effect on handheld computer interface 15. Thus, according to various embodiments, reflex component 80 and/or actuator 82 may cause a haptic effect to be imparted on handheld computer interface 15. In some embodiments, handheld computer interface 15 may include sensors (not otherwise illustrated in FIG. 8) configured to measure forces exerted on and/or by reflex component 80, the reflex haptic effect, actuator 82, the haptic effect, and/or handheld computer interface 15. Information from the sensors may be used to tailor one or more signals to actuator 82 to cause a haptic effect, thereby supplementing, arresting, and/or otherwise modulating the reflex haptic effect imparted by reflex component 80. In some embodiments, reflex component 80 is a mechanical device that generates substantially all of the reflex haptic effect mechanically rather than using signals or currents. In some embodiments, reflex component 80 may be coupled to an actuator or other device that assists or otherwise resists the reflex haptic effect.

FIGS. 9a, 9b, 9c, and 9d are examples of reflex component 80, according to various embodiments.

FIG. 9a is a cut-away view of handheld computer interface 15 that illustrates reflex component 80, according to an embodiment. According to the embodiment illustrated in FIG. 9a, reflex component 80 includes a moving mass 94 disposed inside a cavity 93 disposed within handheld computer interface 15. In some embodiments, moving mass 94 moves inside cavity 93 in response to the user-generated force, thereby imparting a haptic effect to handheld computer interface 15. Cavity 93 may be any shape, including cylindrical, conical, spherical, or other shape in which moving mass 94 may move.

Movement of moving mass 94 in response to the user-generated force may cause the moving mass 94 to impact an inner surface of cavity 93 or other component of handheld computer interface 15, thereby imparting a haptic effect to handheld computer interface 15. In some embodiments, the haptic effect caused by moving mass 94 may cause substantially all of the haptic effect imparted to handheld computer interface 15. In other embodiments, the haptic effect caused by moving mass 94 may supplement (i.e., be in addition to) a haptic effect caused by actuator 82 and vice versa. In other embodiments, actuator 82 causes substantially all of the haptic effect on handheld computer interface 15. Thus, according to various embodiments, moving mass 94 responsive to user-generated motion and/or actuator 82 may cause a haptic effect to be imparted on handheld computer interface 15.

In some embodiments, cavity 93 may include or otherwise be coupled with bumpers 96 that are made of the same material (e.g., soft rubber) as one another or different materials (e.g., soft rubber, hard rubber) from one another. Moving mass 94 may impact bumpers 96, thereby causing a haptic effect.

In some embodiments, cavity 93 may include or otherwise be coupled with bumps 97, which may each be made of the same material (e.g., soft rubber) as one another or different materials (e.g., soft rubber, hard rubber) from one another. Bumps 97 may stop, slow down, or otherwise cause friction on moving mass 94, thereby causing a haptic effect as moving mass 94 moves within cavity 93.

In the embodiment illustrated in FIG. 9a, moving mass 94 may move freely within cavity 93 (notwithstanding bumpers 96 and/or bumps 97). In other embodiments, moving mass 94 may be coupled to a shaft, a spring, or other component (not otherwise illustrated in FIG. 9a) that constrains the movement of moving mass 94.

In some embodiments, cavity 93, moving mass 94, bumpers 96, and/or bumps 97 may be configured such that only force provided by a user that exceeds a predefined threshold will cause moving mass 94 to move. Thus, only force that exceeds the predefined threshold will cause moving mass 94 to impart a haptic effect.

Although illustrated in FIG. 9a as a single moving mass 94, two or more moving masses 94 may be used as would be appreciated by those having skill in the art.

FIG. 9b is a cut-away view of handheld computer interface 15 that illustrates reflex component 80, according to an embodiment. According to the embodiment illustrated in FIG. 9b, reflex component 80 includes a fan component 98, which may be disposed inside handheld computer interface 15. Fan component 98 may spin in one or both directions illustrated by arrows in response to the user-generated force. In this embodiment, handheld computer interface 15 may include vents that allow air to pass through housing 81, thereby causing fan component 98 to move. In some embodiments, fan component 98 may impact an inner portion of handheld computer interface 15 (such as an inner wall of housing 81), thereby causing the reflex haptic effect. In some embodiments, a motor may be coupled to fan component 98 (not otherwise illustrated in FIG. 9b). The motor may assist or resist the motion of fan component 98, thereby enhancing or muting the reflex haptic effect caused by fan component 98.

FIG. 9c is a cut-away view of handheld computer interface 15 that illustrates reflex component 80, according to an embodiment. According to the embodiment illustrated in FIG. 9c, reflex component 80 includes a linkage portion 99 that separates one or more portions 81a and 81b of housing 81. In some embodiments, linkage portion 99 is a hinge or other flexible component that movably couples housing portions 81a and 81b to one another. In this manner, the user-generated force causes housing portions 81a and 81b to impact one another and/or other component of handheld computer interface 15, thereby causing the reflex haptic effect.

FIG. 9d is a cross-sectional view of handheld computer interface 15 that illustrates reflex component 80, according to an embodiment. According to the embodiment illustrated in FIG. 9d, reflex component 80 includes a flexible member 100. In this embodiment, the user-generated force may be a squeezing force exerted on handheld computer interface 15 by the user, thereby deforming flexible member 100. Flexible member 100 may be configured to provide a returning force indicated by arrows that returns flexible member 100 toward an equilibrium position, thereby generating the reflex haptic effect. The equilibrium position is a position and/or orientation in which flexible member 100 exists when the user-generated force is not exerted on flexible member 100. In some embodiments (not otherwise illustrated in FIG. 9d), a motor or other device may be coupled to flexible member 100 to assist or resist the reflex haptic effect provided by flexible member 100.

Those having skill in the art will appreciate that various components illustrated in FIGS. 9a, 9b, 9c, and 9d may differ in number, position, and/or orientation according to particular needs.

As disclosed, a handheld computer interface generates haptic feedback from an impact actuator as well as from other actuators. The haptic effects generated by the impact actuator, other actuators, and/or components described herein provide effective and realistic sensations to simulate the impact from a ball or other object.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A handheld computer interface comprising:
   a handle; and
   an impact actuator coupled to the handle, wherein the impact actuator comprises a movable mass and an end stop, wherein the impact actuator is adapted to receive a haptic effect signal and in response cause the movable mass to contact the end stop to generate a haptic effect, wherein the end stop is adapted to be movably inserted into a travel path of the movable mass, and wherein the movable mass rotates greater than 360° before contacting the end stop.

2. The handheld computer interface of claim 1, wherein the movable mass contacts the end stop through a bumper coupled to the mass.

3. The handheld computer interface of claim 1, wherein the end stop is coupled to a first bumper having first impact properties and a second bumper having second impact properties.

4. The handheld computer interface of claim 1, further comprising:
   an end piece coupled to the handle, the end piece having a shape that simulates an object.

5. The handheld computer interface of claim 1, further comprising:
   a smart material that outputs a surface haptic effect, wherein the smart material is coupled to a surface of the handle, thereby directly imparting the surface haptic effect substantially from the smart material rather than the handle.

6. The handheld computer interface of claim 1, wherein the movable mass moves in response to a user-generated motion of the handheld computer interface, thereby supplementing the haptic effect caused by the impact actuator.

7. A handheld computer interface comprising;
   a housing; and
   a reflex component coupled to the housing, wherein the reflex component is configured to cause a first haptic effect to the housing in response to a user-generated force on the handheld computer interface, wherein the reflex component comprises a movable mass disposed within a cavity of the housing, wherein the user-generated force causes the movable mass to move linearly within the cavity from a resting position towards an end of the cavity, and wherein the first haptic effect is caused by the movable mass striking a bump projecting from an inner surface of the housing into the cavity.

8. The handheld computer interface of claim 7, further comprising an actuator coupled to the housing, wherein the actuator is configured to impart a second haptic effect to the housing.

9. The handheld computer interface of claim 8, wherein the actuator comprises at least one coil surrounding the movable mass, wherein the movable mass is magnetic and the coil is adapted to be energized in response to receiving a haptic effect signal to move the mass along the guide shaft, wherein the actuator supplements the user-generate force.

10. The handheld computer interface of claim 8, further comprising:
    a sensor configured to output sensor information that describes a force of the handheld computer interface, wherein the actuator varies the second haptic effect based on the sensor information.

11. The handheld computer interface of claim 10, wherein the sensor information describes one or more forces imparted on or by the reflex component.

12. The handheld computer interface of claim 10, wherein the sensor information describes a motion of the handheld computer interface.

13. The handheld computer interface of claim 7, further comprising a bumper coupled to the end of the cavity such that the movable mass contacts the bumper to cause a second haptic effect.

* * * * *